US006827175B1

United States Patent
Frazer et al.

(10) Patent No.: US 6,827,175 B1
(45) Date of Patent: Dec. 7, 2004

(54) TORQUE ARM ASSEMBLY FOR A VEHICLE

(75) Inventors: Richard D. Frazer, Berkley, MI (US); Gary J. Engelman, Royal Oak, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 104 days.

(21) Appl. No.: 09/704,934

(22) Filed: Nov. 2, 2000
(Under 37 CFR 1.47)

Related U.S. Application Data
(60) Provisional application No. 60/163,658, filed on Nov. 3, 1999.

(51) Int. Cl.$^7$ .............................................. B60K 17/00
(52) U.S. Cl. ...................... 180/377; 180/337; 180/378
(58) Field of Search ................................ 180/337, 344, 180/345, 374, 377, 378; 74/607

(56) References Cited

U.S. PATENT DOCUMENTS

| 4,699,230 A | * 10/1987 | Solleder et al. ............. 180/378 |
| 5,644,955 A | * 7/1997 | Yamamoto ................... 180/378 |

FOREIGN PATENT DOCUMENTS

JP        4-345532    * 12/1992  ................ 180/378

* cited by examiner

*Primary Examiner*—Eric Culbreth
(74) *Attorney, Agent, or Firm*—Mick A. Nylander

(57) ABSTRACT

A torque arm mounting plate for a differential case housing a differential drive pinion gear. The mounting plate comprises an interface adapted to be circumjacently mounted about the differential drive pinion gear, and a torque arm bracket integral with the interface and spaced apart from the differential drive pinion gear. The torque arm bracket is adapted to fixedly engage one end of a torque arm. The torque arm mounting plate of the present invention provides a common interface between the torque arm and the differential carrier.

9 Claims, 7 Drawing Sheets

TORQUE ARM ASSEMBLY FOR A VEHICLE

This application claims the benefit of U.S. application Ser. No. 60/163,658 filed Nov. 3,1999.

BACKGROUND

The present invention relates generally to a torque arm assembly for a motor vehicle, and more particularly concerns an adaptive mounting plate interfacing between a torque arm and a differential drive housing.

In motor vehicles, and particularly rear wheel drive vehicles, the power transfer components such as universal joints and driveshafts serve to compensate for changes in the line of drive. However, when engine power is applied to the drivetrain, torque is developed in the driving wheels. This twisting action creates changes in the angularity of the line of drive. In particular, when power is transmitted by the driveshaft, the drive pinion gear of the rear differential tries to turn the ring gear. The ring gear must turn the axle shafts and the wheels, so it resists being moved. The pinion gear then attempts to "roll around" the ring gear. Since it cannot, the pinion gear transfers the torque to the differential drive housing. The obvious visible effect of this torque is the tendency of the back end of the vehicle to dip when power is suddenly applied to the driving wheels.

To stabilize the differential housing under torque loads, a torque arm is used to control axle windup during vehicle acceleration and braking. In conventional arrangements, the torque arm is attached directly to the differential carrier housing and the vehicle body. Because most differential housings are unique to the particular vehicle and/or drivetrain, the interface of the torque arm and differential housing is likewise unique. This necessitates expensive tooling and die casting considerations of the differential housing for each different design.

Accordingly, there is a need for an improved torque arm assembly for motor vehicles.

SUMMARY OF THE INVENTION

It is, therefore, an object of the present invention to provide an improved torque arm assembly for motor vehicles. It is another object of the invention to provide a torque arm to differential housing interface adapted to accommodate numerous vehicle and drivetrain configurations.

According to one embodiment of the present invention, the foregoing and other objects and advantages are attained by a torque arm mounting plate for a differential case housing a differential drive pinion gear. The mounting plate comprises an interface adapted to be circumjacently mounted about the differential drive pinion gear, and a torque arm bracket integral with the interface and spaced apart from the differential drive pinion gear. The torque arm bracket is adapted to fixedly engage one end of a torque arm. The torque arm mounting plate of the present invention provides a common interface between the torque arm and the differential carrier.

An advantage of the present invention is that different torque arms which are necessary for accommodating different vehicle designs, different torque levels and different packaging constraints, can be attached to various differential housings with the mounting plate of the present invention. A resulting advantage of the present invention is reduced tooling and die casting costs associated with unique torque arm to differential housing interface designs.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

In the drawings.

DESCRIPTION OF THE PREFERRED EMBODIMENT

Figure 1:
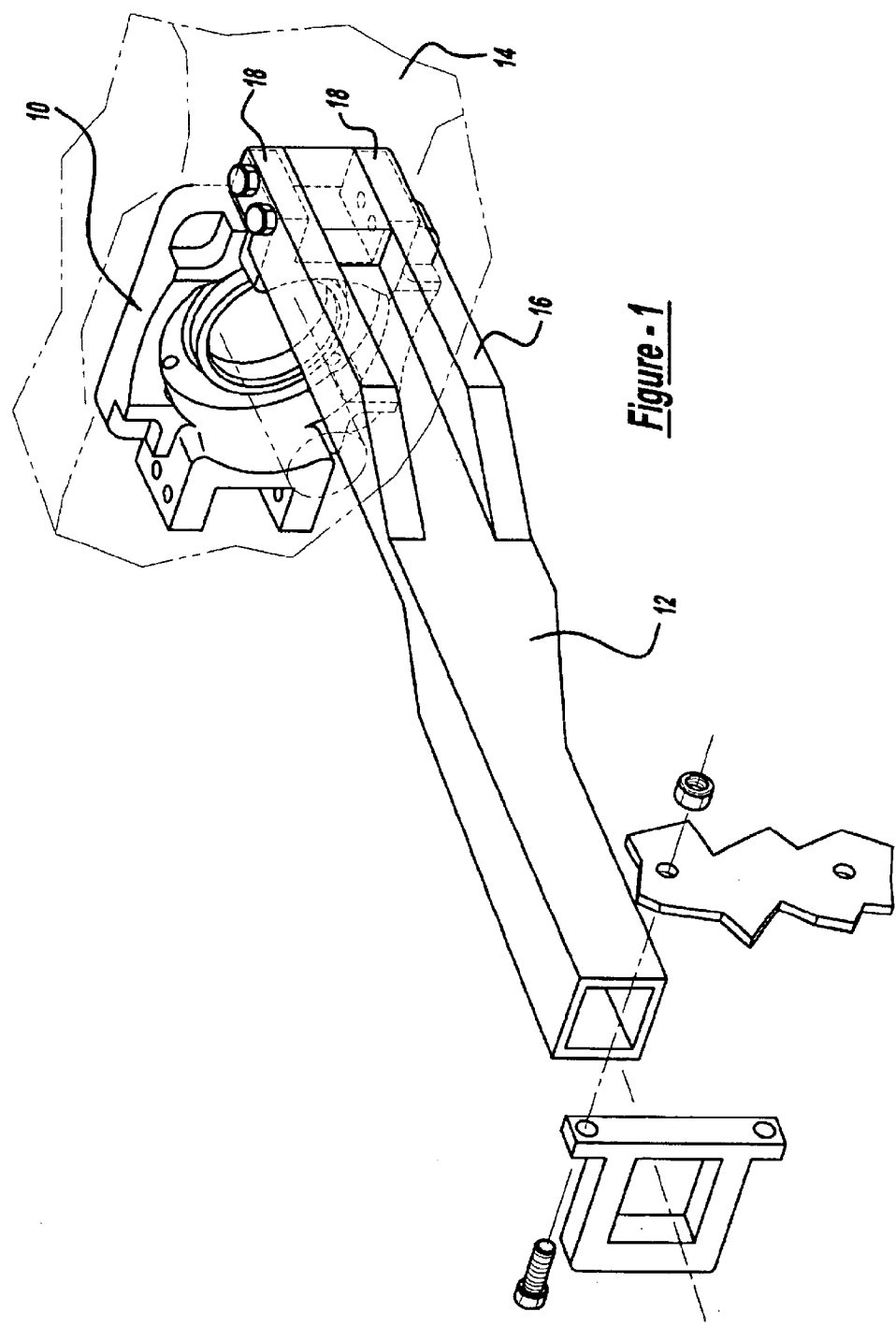
FIG. 1 is a perspective view of one embodiment of a torque arm assembly according to the present invention.

Referring now to FIG. 1, there is shown a perspective view of a torque arm assembly in accordance with the present invention. The assembly comprises a torque arm mounting plate 10 and associated torque arm 12. The torque arm mounting plate 10 acts as a common interface between the torque arm 12 and the differential case 14 which houses a differential drive having a torque input member 16 such as a shaft connected to the differential drive pinion gear. A common feature of differential drive units is the rotational torque input member such as the pinion gear and associated pinion bearing cage 18.

The torque arm mounting plate 10 is advantageously formed to circumjacently mount about the differential drive torque input member 16. In this regard, the interface 20 comprises a circular flange 22 forming an opening for receiving the differential drive torque input member 16. The flange includes a plurality of spaced apertures 24 which are preferably threaded for receiving retaining bolts to secure the mounting plate 10 to the differential case 14. A mounting plate 10 further includes two torque arm brackets 26 which are integral with the interface 20 and spaced apart from the differential drive torque input member 16. The torque arm brackets 26 are used to fixedly engage one end of the torque arm 12 as will be described in more detail below.

The torque arm 12 comprises an elongate body having a first end 28 for connection to the vehicle frame 29 by any known conventional connection means such as bracket 30 and bolt 31, and a second end 32 for fixedly and removably attaching to the torque arm bracket 26.

One embodiment of the torque arm 12 shown in FIG. 1 comprises two generally parallel spaced apart channels 34 which engage respective generally parallel spaced apart struck-up members 36 of the torque arm brackets 26.

Figure 2:
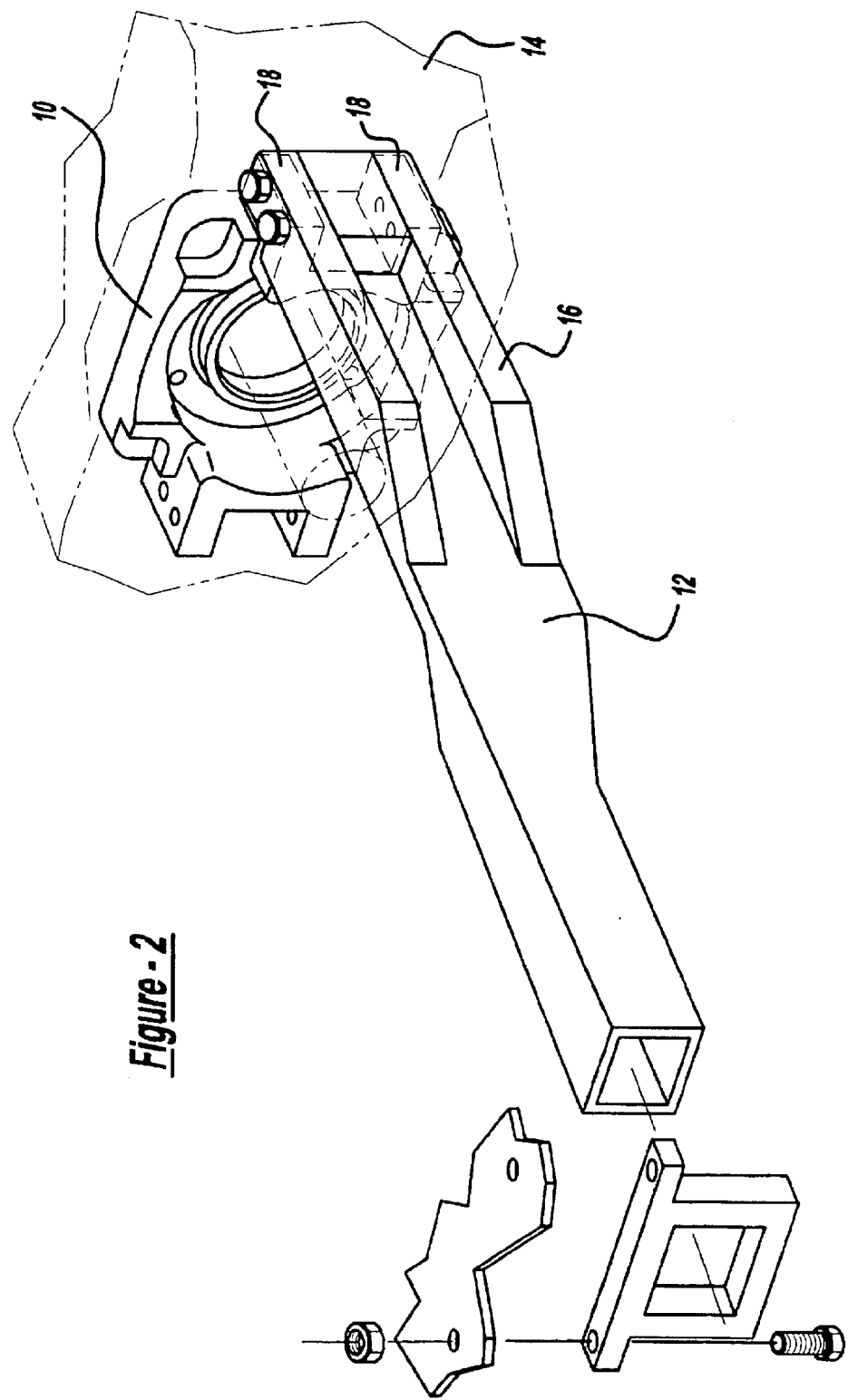
FIG. 2 is perspective view of the torque arm assembly of FIG. 1 with an alternative vehicle mount.

Referring now to FIG. 2, there is shown a perspective view of a torque arm assembly of FIG. 1 having an alternative connection means for the first end 28 of the torque arm 12 with respect to the vehicle frame 29. In this example, the torque arm 12 is secured to the vehicle frame 29 by way of a bushing 38 in cooperation with bolt 31.

Figure 3:
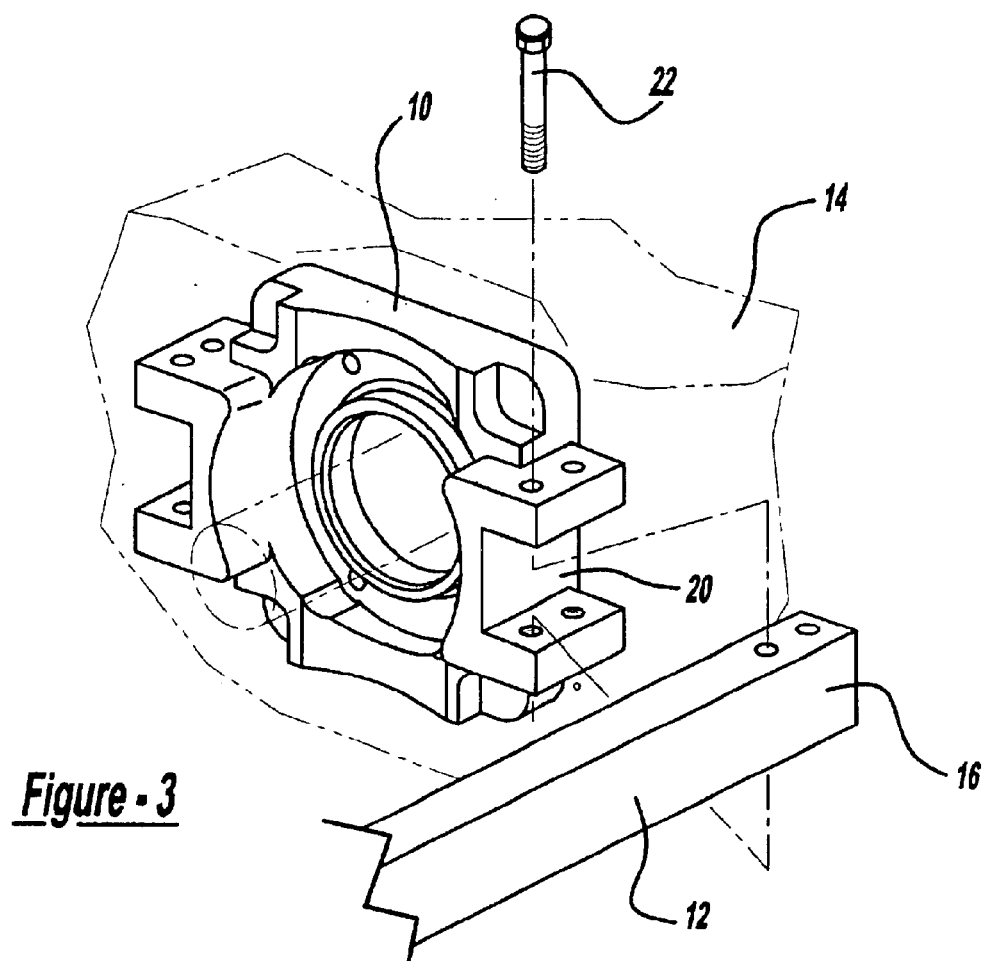
FIG. 3 is a perspective view of another embodiment of a torque arm assembly according to the present invention.
Figure 4:
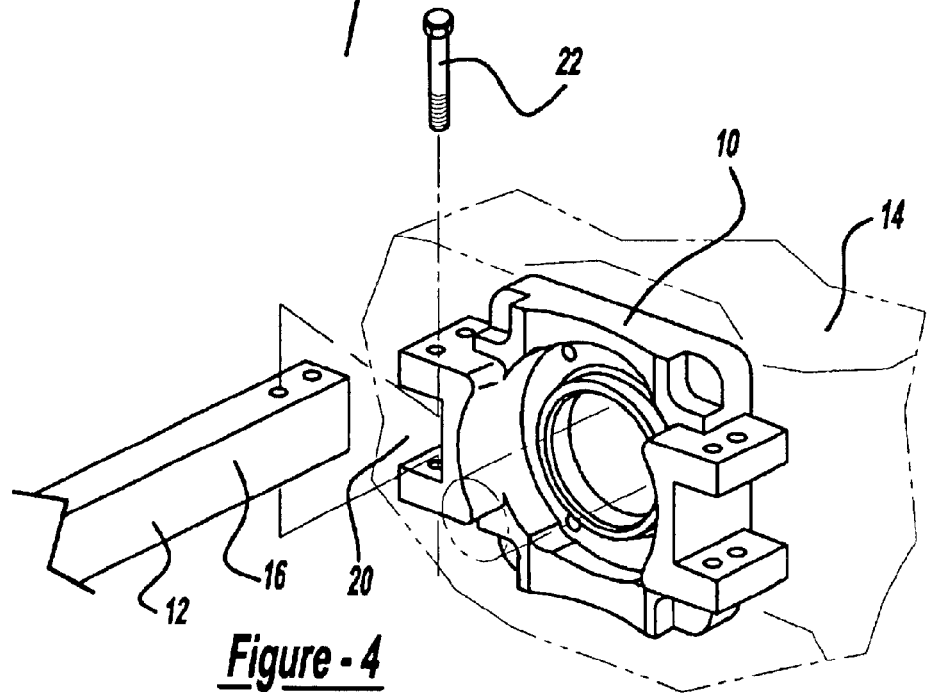
FIG. 4 is a perspective view of another embodiment of the torque arm assembly according to FIG. 3.

Referring now to FIGS. 3 and 4, there is shown perspective views of alternative embodiments of a torque arm assembly according to the present invention. In these examples, the torque arm mounting plate 10 is identical to the torque arm mounting plate 10 shown in FIGS. 1 and 2. The flexibility of the torque arm mounting plate 10 is highlighted, however, by the use of a torque arm 42 having a different configuration from the torque arm 12 of FIG. 1. As shown in FIG. 3, the upper member 44 of the torque arm bracket 26 includes apertures 45, and the lower member 46 of torque arm bracket 26 includes threaded bores 47 for removably and fixedly securing a retaining bolt 48. The spaced apart relationship of the struck-up members 44 and 46 of the bracket 26 provide a cavity 50 for receiving the second end 52 of the torque arm 42. The second end 52 of the torque arm 42 also includes through bores 54 for receiving the retaining bolt 48 and thereby securing the torque arm 42 to the mounting plate 10 and differential case 14.

As shown in FIG. 4, the symmetry of the mounting plate 10 with respect to the differential drive torque input member 16 permits the torque arm 42 to be connected on either side of the torque input member 16 as desired or dictated by vehicle underbody packaging constraints.

Figure 5:
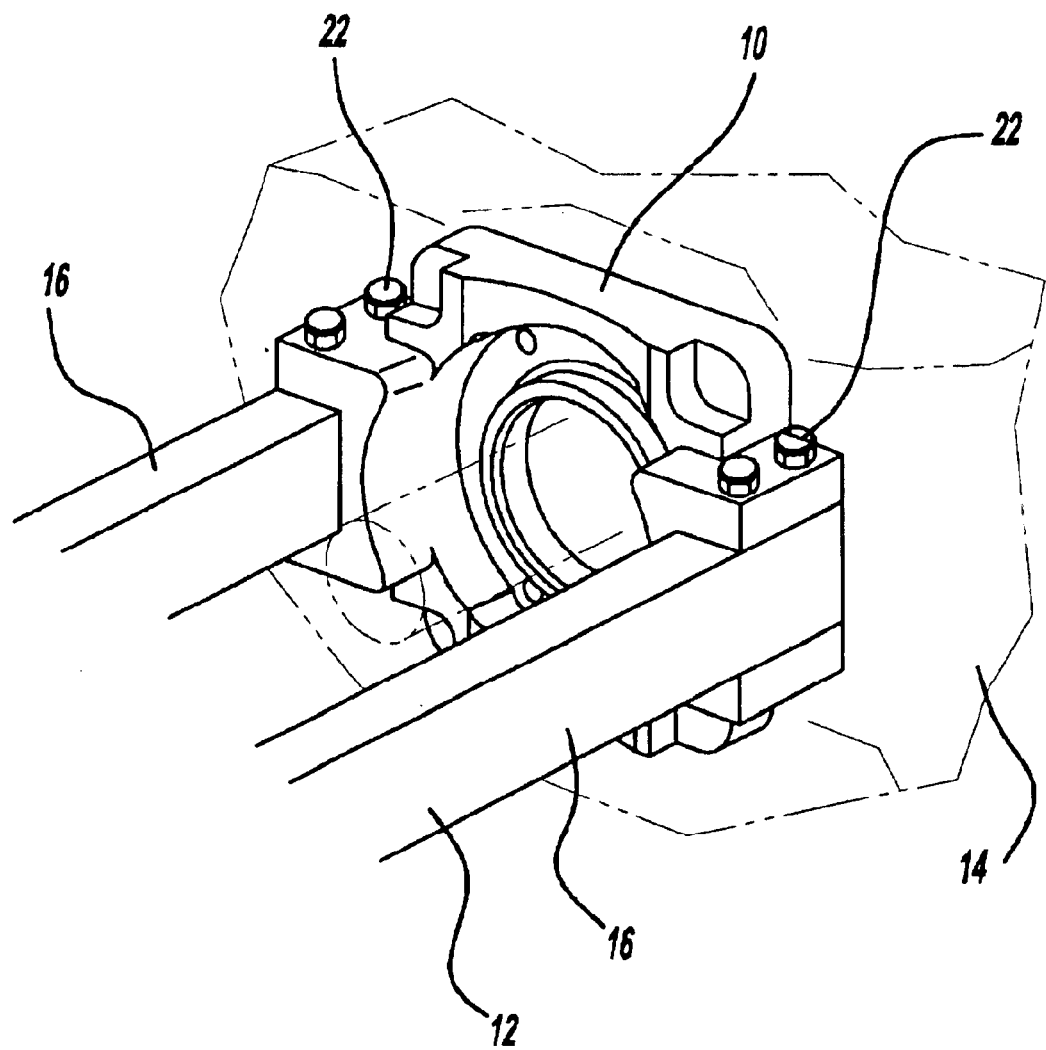
FIG. 5 is a perspective view of another embodiment of the torque arm assembly according to FIG. 3.

Referring now to FIG. 5, there is shown a perspective view of an alternative embodiment of a torque arm assembly according to the present invention. The torque arm assembly of FIG. 5 is identical to the embodiments shown in FIGS. 3 and 4 but incorporates two torque arms 42 to stabilize the angularity of the driveline during sudden torque loads.

Figure 6:
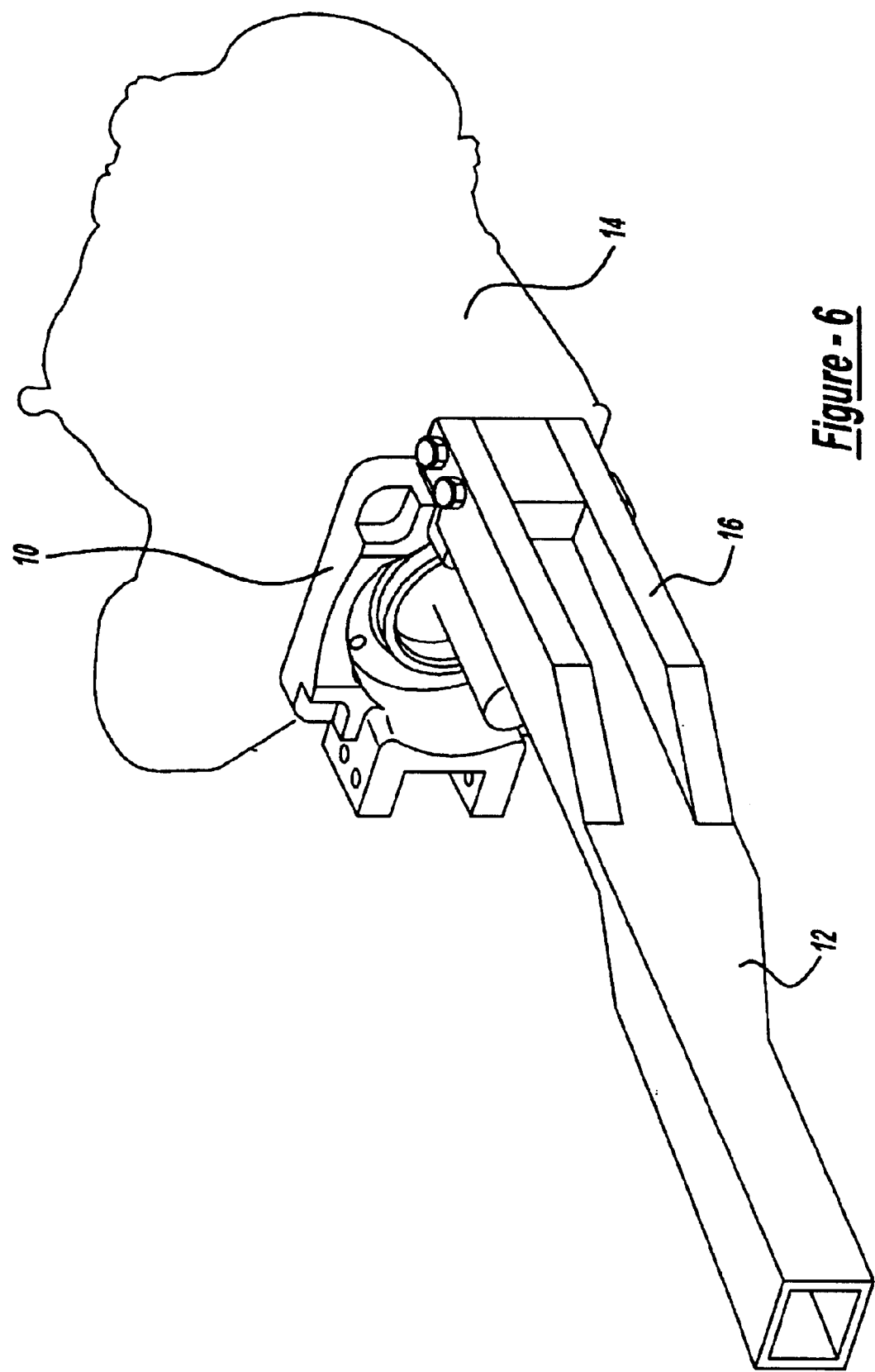
FIG. 6 is a perspective view of one embodiment of a torque arm assembly according to the present invention connected to a differential housing.

Referring now to FIG. 6, there is a shown a perspective view of the torque arm assembly of FIG. 1 with the entirety of the differential case 14 shown. The advantage of the present invention is demonstrated in FIG. 6 as compared to conventional schemes for attaching the torque arm to the differential case as discussed above. In conventional schemes, the torque arm is bolted directly to the differential case 14. Thus, there is no mechanical structure other than the attaching bolt for securing the torque arm to the differential case 14. As shown in FIG. 6, however, the channel 34 of the torque arm 12 which registers with the upper and lower members 44, 46 of the bracket 26 provide an additional mechanical support for the connection between the torque arm 12 and the mounting plate 10.

Figure 7:
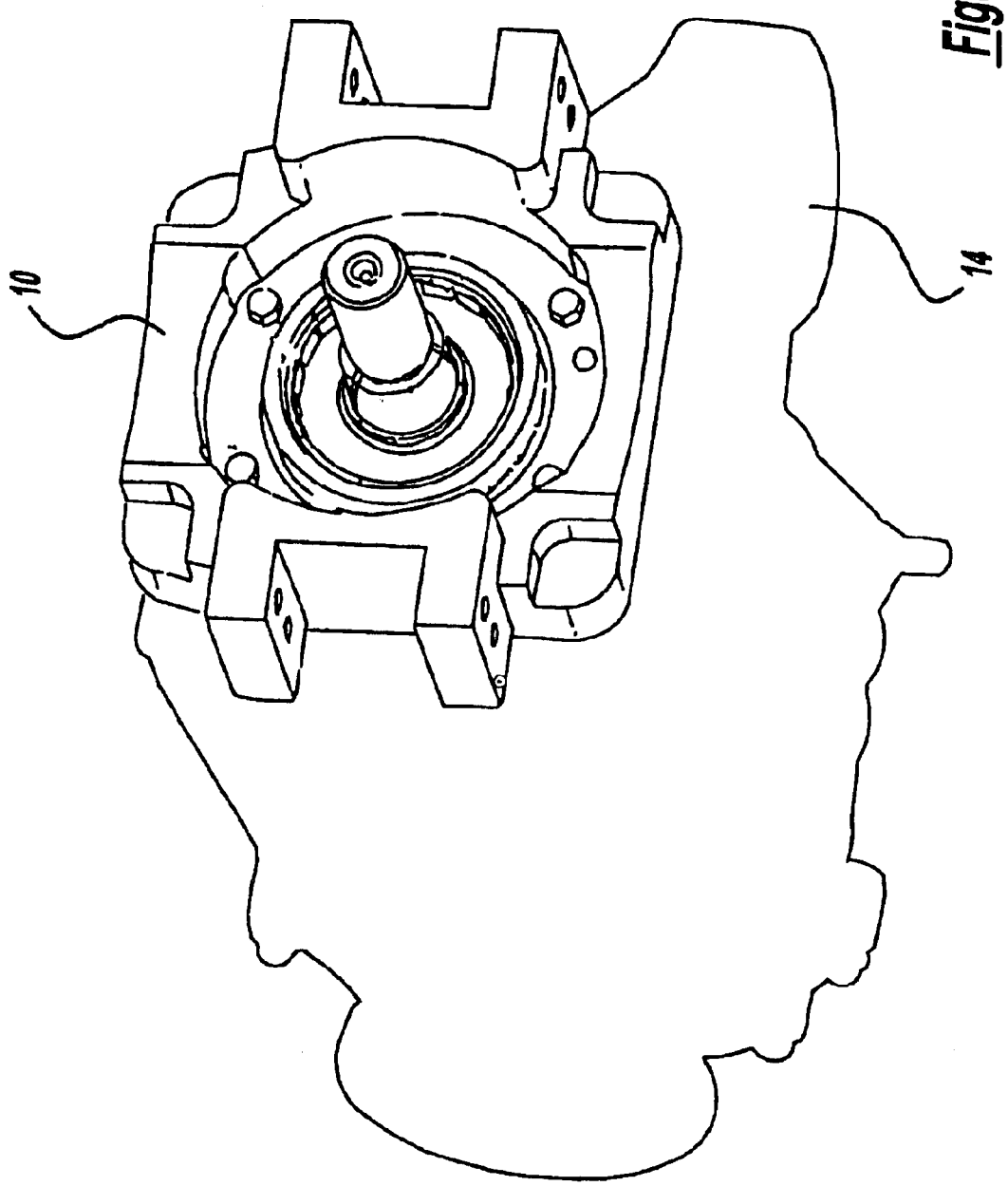
FIG. 7 is a perspective view of the torque arm mounting plate of FIG. 6 connected to a differential housing.

Referring now to FIG. 7, there is shown an alternative embodiment for a torque arm mounting plate in accordance with the present invention. A torque arm mounting plate 60 is identical in all respects to the torque arm mounting plate 10 of FIG. 1 with the addition of a post 62 in the cavity between the upper and lower members of the respective brackets 64. The post 62 can be included as an additional mechanical means by which translational movement between the torque arm (not shown) and the mounting plate 60 is prevented. Numerous alternative embodiments are contemplated by the present invention for the brackets 64 which would provide similar mechanical interfaces for securing the torque arm to the torque arm mounting plate 60. FIG. 7 also shows a detail of the circular flange 66 used to fixedly attach the mounting plate 60 to the differential case 14 by way of threaded bolts 68. The flange 66 forms an opening for circumjacently mounting the interface about the differential drive torque input member 70. The differential drive torque input member is typically a pinion gear including a pinion bearing cage surround by a collect 72. In contrast to the varied shapes of differential housings, the circular collect 72 is a common feature of most differential drive units. Thus, the preferred shape of the mounting plate interface is a circular flange 66 as shown. The symmetrical nature of the torque arm mounting plate 60 with respect to the differential drive torque input member 70 is also advantageous in that it provides ease of assembly. Preferably, the bracket 64 project generally perpendicular to the circumference defined by the flange 66 to maintain a spaced relationship between the differential drive torque input member and the torque arm, as well as to provide access to the securing bolts 68 once the mounting plate 60 and torque arm have been attached to the differential case 14.

In an alternative embodiment of a torque arm assembly according to the present invention, a torque tube can be fixedly attached such as by press fitting or by mounting bolts to the interior surface 74 of the bracket 64. In such case, the torque tube would surround the differential drive torque input member and a portion of the driveshaft.

Figure 8:
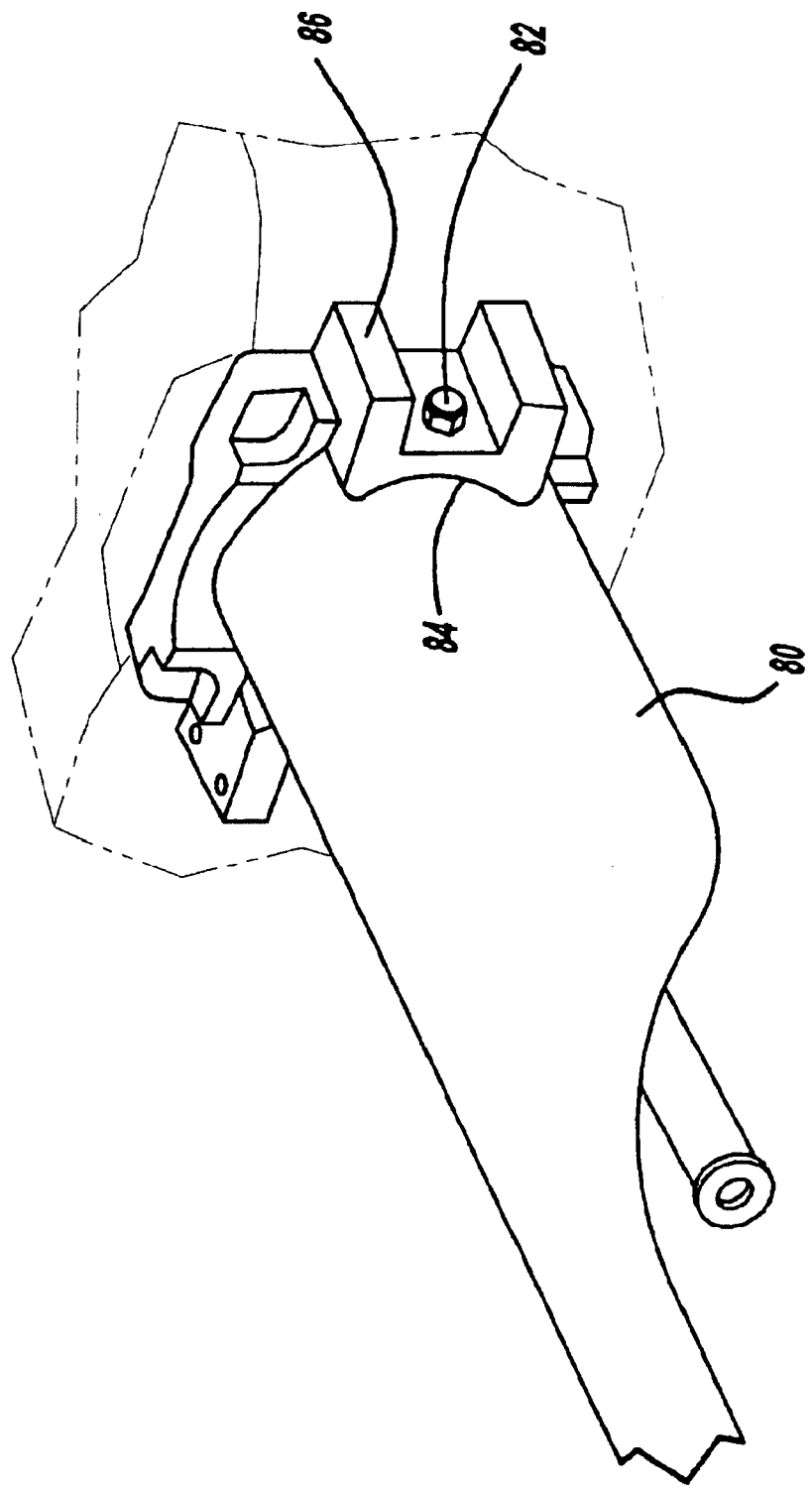
FIG. 8 is a perspective view of a torque arm assembly in accordance with another embodiment of the present invention incorporating a torque tube.

Referring now to FIG. 8, there is shown a perspective view of a torque arm assembly in accordance with the present invention wherein a torque tube 80 is mounted to the interior side 84 of the brackets 86 by way of a retaining bolt 82.

From the foregoing, it can be seen that there has been brought to the art a new and improved torque arm assembly for a vehicle which overcomes the drawbacks associated with conventional torque arm assemblies. While the invention has been described in connection with one or more embodiments, it should be understood that the invention is not limited to those embodiments. On the contrary, the invention covers all alternatives, modifications, and equivalents, as may be included within the spirit and scope of the appended claims.

What is claimed is:

1. A torque arm assembly for use with a motor vehicle having a differential case housing a differential drive having a torque input member, the assembly comprising:

a torque arm interface adapted to be mounted on said differential case adjacent said differential drive torque input member, said interface including a torque arm bracket integral with said interface; and a torque arm having an elongate body including a first end for connection to the vehicle and a second end removably attached to said torque arm bracket.

2. The torque arm assembly of claim 1 wherein said interface comprises a circular flange forming an opening for receiving said differential drive torque input member, said flange including a plurality of spaced apertures, each of said apertures adapted to receive a retaining bolt for fixedly attaching said interface to said differential case.

3. The torque arm assembly of claim 2 wherein said torque arm bracket projects in perpendicular relation to a circumference defined by said circular flange.

4. The torque arm assembly of claim 1 comprising a second torque arm bracket integral with said interface and spaced apart from and opposite said torque arm bracket.

5. The torque arm assembly of claim 4 wherein said interface is symmetrical with respect to a rotational axis of said differential drive torque input member.

6. The torque arm assembly of claim 1 wherein said torque arm comprises a torque tube.

7. A rear drive assembly for a motor vehicle having a frame and a differential drive having a torque input member, the assembly comprising:

a differential case for housing said differential drive, said case comprising a collect formed about said torque input member;

a torque arm interface removably attached to said collect circumjacent said torque input member, said interface including a first torque arm bracket integral with said interface; and a torque arm having an elongate body including a first end for connection to the vehicle frame and a second end removably attached to said torque arm bracket.

8. The rear drive assembly of claim 7 wherein said interface comprises a circular flange forming an opening for receiving said torque input member, said flange including a plurality of spaced apertures, each of said apertures adapted to receive a retaining bolt for fixedly attaching said interface to said collect.

9. The rear drive assembly of claim 7 comprising a second torque arm bracket integral with said interface and spaced apart from and opposite said first torque arm bracket such that said interface is symmetrical with respect to a rotational axis of said torque input member.

* * * * *

UNITED STATES PATENT AND TRADEMARK OFFICE
CERTIFICATE OF CORRECTION

PATENT NO. : 6,827,175 B1
DATED : December 7, 2004
INVENTOR(S) : Richard D. Frazer and Gary J. Engelman It is certified that error appears in the above-identified patent and that said Letters Patent is hereby corrected as shown below:

Column 5,
Lines 5 and 7, delete "collect" and insert -- collet --

Column 6,
Line 6, delete "collect" and insert -- collet --

Signed and Sealed this

Fifth Day of April, 2005

JON W. DUDAS
*Director of the United States Patent and Trademark Office*